UNITED STATES PATENT OFFICE.

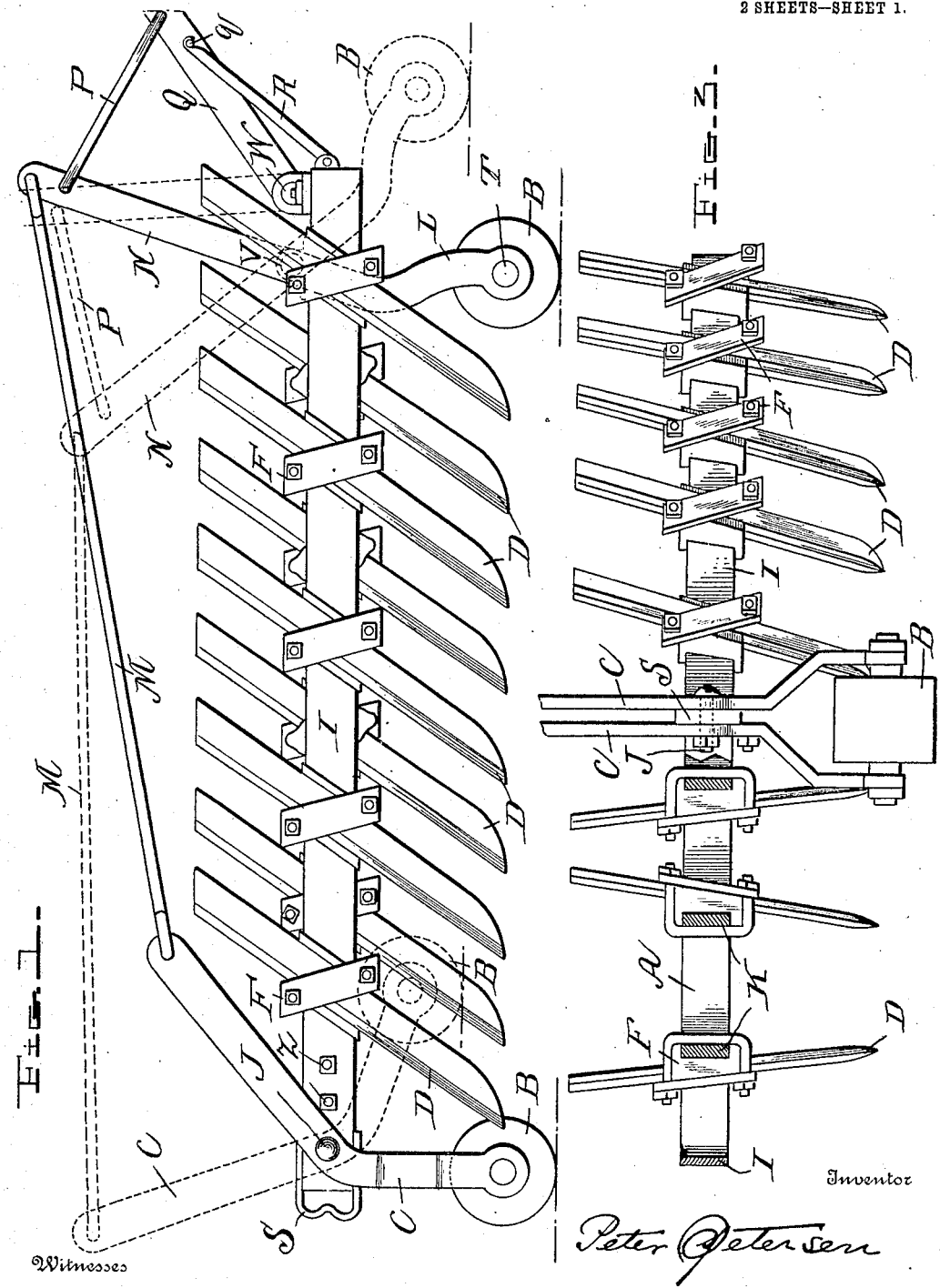

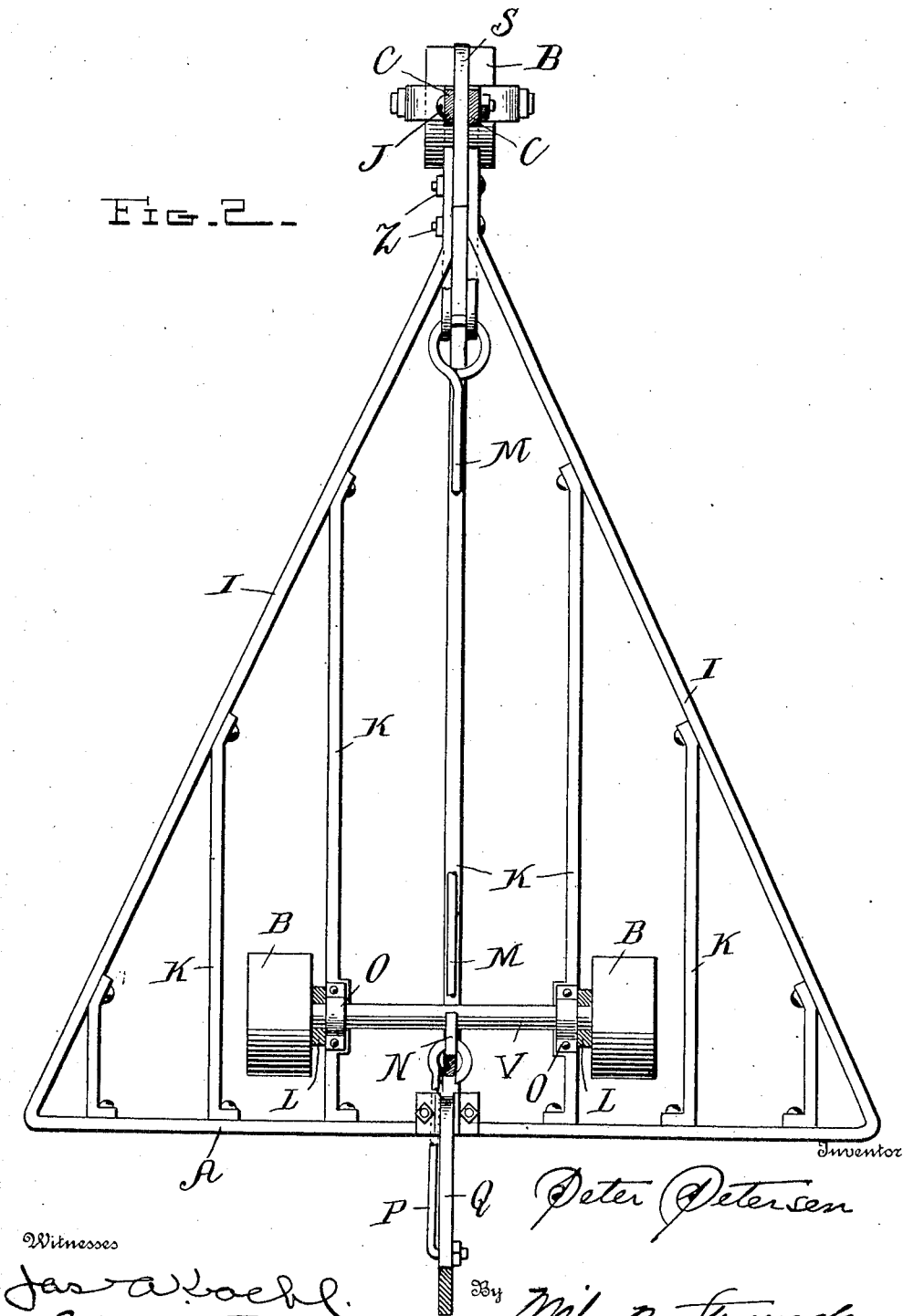

PETER PETERSEN, OF CHICAGO, ILLINOIS.

AGRICULTURAL IMPLEMENT.

No. 851,959.

Specification of Letters Patent.

Patented April 30, 1907.

Application filed January 17, 1907. Serial No. 352,772.

*To all whom it may concern:*

Be it known that I, PETER PETERSEN, a citizen of the United States, residing at Chicago, in the county of Cook and State of Illinois, have invented certain new and useful Improvements in Agricultural Implements, of which the following is a specification.

This invention is an agricultural implement of the nature of a harrow or plow, and is designed particularly for use in hard soil, to cut and pulverize the same, so that little or no ordinary harrowing is required for sowing, or on marsh land where the soil cannot readily be turned.

The object of the invention is to provide an implement having an improved frame, provided with means whereby it may be raised or lowered so as to throw it out of or into action; and also characterized by an improved manner of setting the blades or teeth so that they will cut roots and effectively disturb the soil.

In the accompanying drawings, Figure 1 is a side elevation of the implement. Fig. 2 is a top plan view of the frame, the knives and other parts being removed for the sake of clearness. Fig. 3 is a front view partly in section.

The frame is triangular in shape, and comprises inclined side bars I connected at the front by bolts Z to a clevis or draft piece S, and connected at the rear by a cross bar A. Located within the triangular frame thus formed are a series of longitudinal inner bars K which are parallel to each other and which are spaced substantially the same distance apart, the middle one extending from the clevis piece S to the rear cross bar, and the remainder extending from the side bars I to said rear bar. The knives or teeth D are secured to these bars by clamps F. The knives are arranged at an inclination upwardly and backwardly so as to effectively enter the soil, and are, furthermore, inclined laterally in opposite directions on the alternate bars. They are thus clamped to lean in opposite directions so that as they pass through the ground they will effectively and thoroughly cut all the roots in their path. The front edges of the knives are sharpened and their lower ends pointed to assist or perform the cutting action. Several knives are placed on each of the inclined and longitudinal bars so as to cut the earth in narrow strips, and, in consequence of the large number of knives, to fully pulverize and disintegrate the same. The knives may be set higher or lower in the clamps, to vary the depth of the cut.

The implement is carried upon rollers B, of which there are three, two at the rear end and one at the front end. The rear rollers are mounted upon an axle T, mounted in bearings at the lower ends of the arms L depending from a rock shaft V which is mounted in bearings O upon two of the longitudinal bars K. Said rock shaft has an upwardly projecting lever arm N.

The front roller B is carried in bearings at the lower ends of a pair of bars C which form a lever fulcrumed by a bolt J upon the draft piece S at the front of the machine. The upper ends of the levers C and N are connected together by a rod M, and the lever N is connected by a link P with an operating lever Q which is fulcrumed at W upon the rear of the frame. When thrown down or back the lever Q may be secured by a hook R which is hinged to the rear bar of the frame and which hooks over a pin q on said operating lever.

When the lever Q is thrown back the rollers B are thrown down as shown in full lines in Fig. 1, lifting the knives from the ground and putting the implement out of action. When the lever Q is released it swings forward and the rollers are lifted as shown in dotted lines in Fig. 1, allowing the knives to take into the ground, to put the implement into action.

The frame is designed to have the strength necessary to stand the strain which, in hard or new ground, is considerable. The longitudinal bars K act as braces to form a stout and rigid frame, and are also most advantageously disposed for transmitting the strain directly to the clevis piece. On new or virgin ground the implement is particularly useful, since in consequence of the longitudinal and lateral inclination of the knives, it will cut roots and stalks, and it may be readily raised and lowered by manipulation of the lever to clear rocks, stumps and other obstacles. For breaking in new ground it serves the purpose of a plow, and it may also be readily used as a harrow on old or plowed fields.

The rock shaft V is located a short distance in front of the rear cross bar A, and the depending arms L are so shaped and positioned that when they are swung up they will strike the under edge of the cross bar A, thereby limiting their backward swing. This stops the drop of the frame and consequently prevents the knives from running into the ground too far, since the rollers travel on the surface of the ground when the knives are in operation.

I claim:

1. An agricultural implement comprising a triangular frame having inclined side bars and a rear cross bar, a draft piece at the front to which the front ends of the side bars are connected, a central longitudinal bar extending from the draft piece to the rear bar, and a plurality of longitudinal bars extending from the side bars to the rear bar, parallel to the central bar, and blades secured to the side and longitudinal bars.

2. In an agricultural implement, in combination, a triangular frame having inclined side bars and a cross rear bar connecting the rear ends of the side bars, and longitudinal bars connecting the side bars and the rear bar, blades carried by said bars, a lever pivoted at the front of the frame and having a roller at its lower end, a rock shaft extending across some of the longitudinal bars at the rear of the frame and mounted in bearings thereon, and having depending arms carrying rollers at the opposite ends thereof, said arms being arranged to contact with the under side of the rear bar when swung up, a lever arm extending upwardly from the rock shaft and connected to the front lever, and an operating lever connected to the said lever arm.

In testimony whereof I affix my signature in presence of two witnesses.

PETER PETERSEN.

Witnesses:
 NELLIE FELTSKOG,
 H. G. BATCHELOR.